United States Patent
Huang et al.

(10) Patent No.: US 10,177,576 B2
(45) Date of Patent: Jan. 8, 2019

(54) CHARGER CIRCUIT AND CAPACITIVE POWER CONVERSION CIRCUIT AND REVERSE BLOCKING SWITCH CIRCUIT THEREOF

(71) Applicant: RICHTEK TECHNOLOGY CORPORATION, Zhubei, Hsinchu (TW)

(72) Inventors: Wei-Jen Huang, New Taipei (TW); Shui-Mu Lin, Taichung (TW); Tsung-Wei Huang, Taipei (TW); Chih-Hua Hou, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 44 days.

(21) Appl. No.: 15/633,694

(22) Filed: Jun. 26, 2017

(65) Prior Publication Data

US 2018/0083459 A1 Mar. 22, 2018

Related U.S. Application Data

(60) Provisional application No. 62/285,897, filed on Sep. 20, 2016, provisional application No. 62/406,724, filed on Oct. 11, 2016.

(30) Foreign Application Priority Data

Mar. 21, 2017 (CN) .......................... 2017 1 0169057

(51) Int. Cl.
H02J 7/00 (2006.01)
H02J 7/02 (2016.01)

(52) U.S. Cl.
CPC .......... *H02J 7/0008* (2013.01); *H02J 7/0045* (2013.01); *H02J 7/0052* (2013.01); *H02J 7/0077* (2013.01); *H02J 7/022* (2013.01); *H02J 7/027* (2013.01)

(58) Field of Classification Search
CPC ....... Y02E 60/12; H02J 7/0042; H02J 7/0045; H01M 10/46; H01M 10/44
(Continued)

(56) References Cited

U.S. PATENT DOCUMENTS 5,990,665 A * 11/1999 Kawata ................. H02J 7/0068
320/162
6,326,769 B1 * 12/2001 Forsberg ............... H01M 10/44
320/124

(Continued)

*Primary Examiner* — Arun C Williams
(74) *Attorney, Agent, or Firm* — Tung & Associates

(57) ABSTRACT

A charger circuit for providing a charging current and voltage to a battery includes a power delivery unit, a capacitive power conversion circuit and a reverse blocking switch circuit. The power delivery unit converts an input power to a DC voltage and current. The capacitive power conversion circuit includes a conversion switch circuit including plural conversion switches coupled with one or more conversion capacitors, and a conversion control circuit. The DC current is regulated to a predetermined DC current level, and the conversion control circuit controls the connections of the plural conversion capacitors such that the charging current is scaled-up of the predetermined DC current level substantially by a current scale-up factor. The reverse blocking switch circuit is coupled in series with the capacitive power conversion circuit. The body diode of the reverse blocking switch is reversely coupled to the body diode of the conversion switch.

14 Claims, 17 Drawing Sheets

(58) Field of Classification Search
USPC .......................................................... 320/107
See application file for complete search history.

(56) References Cited

U.S. PATENT DOCUMENTS

| | | | | | |
|---|---|---|---|---|---|
| 2001/0033501 | A1* | 10/2001 | Nebrigic | ............... | H02J 7/0065 |
| | | | | | 363/49 |
| 2006/0145748 | A1* | 7/2006 | Ki | ..................... | H02M 3/073 |
| | | | | | 327/536 |
| 2007/0194759 | A1* | 8/2007 | Shimizu | ................ | H02J 7/0016 |
| | | | | | 320/166 |
| 2009/0224743 | A1* | 9/2009 | Bairanzade | ............ | H02M 3/07 |
| | | | | | 323/293 |
| 2009/0309547 | A1* | 12/2009 | Nakatsuji | ............ | H01M 10/441 |
| | | | | | 320/134 |
| 2010/0022828 | A1* | 1/2010 | Ono | ................... | A61B 1/00036 |
| | | | | | 600/109 |
| 2012/0235641 | A1* | 9/2012 | Yang | .................... | H02J 7/0024 |
| | | | | | 320/110 |
| 2016/0329863 | A1* | 11/2016 | Higuchi | ................. | H02S 50/00 |

\* cited by examiner

CHARGER CIRCUIT AND CAPACITIVE POWER CONVERSION CIRCUIT AND REVERSE BLOCKING SWITCH CIRCUIT THEREOF

CROSS REFERENCE

The present invention claims priority to U.S. 62/396,897, filed on Sep. 20, 2016, U.S. 62/406,724, filed on Oct. 11, 2016, and CN 201710169057.8, filed on Mar. 21, 2017.

BACKGROUND OF THE INVENTION

Field of Invention

The present invention relates to a charger circuit; particularly, it relates to a charger circuit which can scale up the charging current with a capacitive power conversion circuit, and is capable of blocking a reverse current therein. The present invention also relates to a capacitive power conversion circuit and a reverse blocking switch circuit of the charger circuit.

Description of Related Art

FIG. 1 shows a prior art charging circuit (charging circuit 1) which comprises an adaptor 11 capable of directly charging a battery 50. The adaptor 11 can provide a charging current IBAT through a cable 20 (for example a USB cable) and a load switch 40 to the battery 50 for charging the battery 50 by a constant current. However, when using a USB standard cable, the maximum current is limited by the cable current rating, which is 5 A or lower, and therefore a longer charging time is required. If it is desired to raise the charging current, for example to 8 A or higher to expedite the charging time, a specially-designed fast charging cable with a larger diameter is required. However, it is inconvenient to use the fast charging cable, because first, it is a non-standard cable, and second, the fast charging cable is less flexible for accommodation due to its larger diameter.

FIG. 2 shows a prior art charging circuit (charging circuit 2) which includes a switching conversion circuit 90 which can convert the power provided by the adaptor 11 (for example but not limited to 5V, 9V, or 12V VBUS of USB PD) to a charging current IBAT to charge a battery 50 by a constant current. The prior art circuit in FIG. 2 has a drawback that it is very difficult to optimize the choices of the specifications of the inductor and switches (both not shown) of the switching conversion circuit 90 so that critical parameters such as the charging current, current ripple amplitude, conduction resistance of the switch, power conversion efficiency and etc. can be optimized.

Compared to the prior art in FIG. 1, the present invention is advantageous in providing a scale-up charging current for charging a battery to shorten the charging time, while a standard cable such as a USB compliant cable can be used, through which only a relatively lower current is allowed. Compared to the prior art in FIG. 2, the present invention is advantageous in not requiring an inductor, having a smaller size, lower cost, and easier optimization for component selections to maximize power conversion efficiency. In addition, the present invention can further avoid the occurrence of a reverse current, which is caused by for example a body diode of a switch in the charging path of the charger circuit.

SUMMARY OF THE INVENTION

From one perspective, the present invention provides a charger circuit, configured to operably convert an input power to a DC power and convert the DC power to a charging power for charging a battery, wherein the DC power includes a DC voltage and a DC current and the charging power includes a charging voltage and a charging current; the charger circuit comprising: a power delivery unit, configured to operably convert the input power to the DC power; and at least one capacitive power conversion circuit, including: a conversion switch circuit, configured to operably convert the DC power to a converted output power which includes a converted output voltage and a converted output current, wherein the charging power is related to the converted output power; wherein the conversion switch circuit includes plural conversion switches, configured to be coupled to at least one conversion capacitor, wherein at least one of the conversion switches includes a body diode; a control circuit, configured to operably generate a conversion switch control signal to control the plural conversion switches; and at least one reverse blocking switch circuit, coupled with the battery and the conversion switch circuit in series, and configured to block a parasitic body current flowing through the body diode of the conversion switch, wherein the reverse blocking switch circuit includes at least one reverse blocking switch which has a body diode, and the body diode of the reverse blocking switch is reversely coupled to said body diode of the conversion switch; wherein in a charging mode, the power delivery unit regulates the DC current to a predetermined DC current level, and/or regulates the DC voltage to a predetermined DC voltage level, and during plural charging conversion time periods in a cycle period, the conversion switch control signal operates the plural conversion switches so as to electrically connect the conversion capacitor between a pair of nodes selected from one or more charging voltage division nodes, the DC voltage, and a ground node periodically, such that the charging current is scaled-up of the predetermined DC current level substantially by a predetermined factor, the factor being larger than 1 whereby the charging current is larger than the DC output current, and/or the charging voltage is substantially a predetermined voltage ratio of the predetermined DC voltage level; wherein the converted output power is generated through one of the one or more charging voltage division nodes.

In one embodiment, the reverse blocking switch is connected in series between the power delivery unit and the capacitive power conversion circuit, or between the battery and the capacitive power conversion circuit.

In one embodiment, the charger circuit includes plural capacitive power conversion circuits and the reverse blocking switch circuit includes plural reverse blocking switches, wherein the plural capacitive power conversion circuits are coupled in parallel and/or the plural reverse blocking switches are coupled in parallel.

In one embodiment, the reverse blocking switch circuit further includes a regulation protection switch and a first regulation comparator and/or a second regulation comparator, wherein the first regulation comparator is configured to operably compare a charging current related signal and a regulation current threshold to generate a regulation current comparison result, and control the regulation protection switch according to the regulation current comparison result, such that the charging current is regulated to be not larger than a predetermined regulation current level; and the second regulation comparator is configured to operably compare a charging voltage related signal and a regulation voltage threshold to generate a regulation voltage comparison result, and control the regulation protection switch according to the regulation voltage comparison result, such that the charging voltage is regulated to be not larger than a predetermined regulation voltage level.

In one embodiment, the capacitive power conversion circuit and the reverse blocking switch circuit are integrated into an integrated circuit or packaged into an integrated circuit package.

In one embodiment, the charger circuit further includes at least an over voltage protection switch, wherein a voltage rating of an input terminal of the over voltage protection switch is higher than a voltage rating of an input terminal of the reverse blocking switch, and/or higher than a voltage rating of an input terminal of the conversion switch, wherein the control circuit further generates an over voltage control signal to control a control terminal of the over voltage protection switch.

In one embodiment, the control circuit includes a first regulation comparator and/or a second regulation comparator, wherein the first regulation comparator is configured to operably compare a charging current related signal and a regulation current threshold to generate a regulation current comparison result, and control the over voltage protection switch according to the regulation current comparison result, such that the charging current is regulated to be not larger than the predetermined regulation current level; and the second regulation comparator is configured to operably compare a charging voltage related signal and a regulation voltage threshold to generate a regulation voltage comparison result, and control the over voltage protection switch according to the regulation voltage comparison result, such that the charging voltage is regulated to be not larger than the predetermined regulation voltage level.

In one embodiment, the charger circuit includes plural over voltage protection switches, wherein the plural over voltage protection switches are configured to operably sense and control currents flowing through the over voltage protection switches such that the currents flowing through the over voltage protection switches are substantially the same as one another.

In one embodiment, the charger circuit further includes a cable and/or a connector, coupled between the power delivery unit and the capacitive power conversion circuit, or coupled between the power delivery unit and the reverse blocking switch circuit, wherein the cable and the connector are compliant to the Universal Serial Bus or Universal Serial Bus Power Delivery (USB or USB PD) specifications, and the cable and/or the connector includes a power line and a signal line, wherein the power line is coupled to the DC power and the signal line is configured to operably transmit one or more of a DC current related signal, a DC voltage related signal, a charging current related signal, and a charging voltage related signal.

From another perspective, the present invention provides a capacitive power conversion circuit for use in a charger circuit which is configured to operably convert an input power to a DC power and convert the DC power to a charging power for charging a battery, wherein the DC power includes a DC voltage and a DC current and the charging power includes a charging voltage and a charging current, the capacitive power conversion circuit includes: a conversion switch circuit, configured to operably convert the DC power to a converted output power which includes a converted output voltage and a converted output current, wherein the charging power is related to the converted output power; wherein the conversion switch circuit includes plural conversion switches, configured to be coupled to at least one conversion capacitor, wherein at least one of the conversion switches includes a body diode; a control circuit, configured to operably generate a conversion switch control signal to control the plural conversion switches; and at least one reverse blocking switch circuit, coupled with the battery and the conversion switch circuit in series, and configured to block a parasitic body current flowing through the body diode of the conversion switch, wherein the reverse blocking switch circuit includes at least one reverse blocking switch which has a body diode, and the body diode of the reverse blocking switch is reversely coupled to said body diode of the conversion switch; wherein in a charging mode, during plural charging conversion time periods in a cycle period, the conversion switch control signal operates the plural conversion switches so as to electrically connect the conversion capacitor between a pair of nodes selected from one or more charging voltage division nodes, the DC voltage, and a ground node periodically, such that the charging current is scaled-up of the DC current substantially by a predetermined factor, the factor being larger than 1 whereby the charging current is larger than the DC output current, and/or the charging voltage is substantially a predetermined voltage ratio of the DC voltage; wherein the converted output power is generated through one of the one or more charging voltage division nodes.

From another perspective, the present invention provides a reverse blocking switch circuit for use in a charger circuit which is configured to operably convert an input power to a DC power and convert the DC power to a charging power for charging a battery, wherein the DC power includes a DC voltage and a DC current and the charging power includes a charging voltage and a charging current, wherein the charger circuit comprises: a power delivery unit which is configured to operably convert the input power to the DC power; and a capacitive power conversion circuit, including: a conversion switch circuit, configured to operably convert the DC power to a converted output power which includes a converted output voltage and a converted output current, wherein the charging power is related to the converted output power; wherein the conversion switch circuit includes plural conversion switches, configured to be coupled to at least one conversion capacitor, wherein at least one of the conversion switches includes a body diode; the reverse blocking switch circuit being coupled with the battery and the conversion switch circuit in series, and configured to block a parasitic body current flowing through the body diode of the conversion switch; the reverse blocking switch circuit comprising: at least one reverse blocking switch which has a body diode, and the body diode of the reverse blocking switch is reversely coupled to said body diode of the conversion switch; a regulation protection switch, coupled in series with the reverse blocking switch; and a first regulation comparator and/or a second regulation comparator, wherein the first regulation comparator is configured to operably compare a charging current related signal and a regulation current threshold to generate a regulation current comparison result, and control the regulation protection switch according to the regulation current comparison result, such that the charging current is regulated to be not larger than a predetermined regulation current level; and the second regulation comparator is configured to operably compare a charging voltage related signal and a regulation voltage threshold to generate a regulation voltage comparison result, and control the regulation protection switch according to the regulation voltage comparison result, such that the charging voltage is regulated to be not larger than a predetermined regulation voltage level; wherein in a charging mode, during plural charging conversion time periods in a cycle period, the conversion switch control signal operates the plural conversion switches so as to electrically connect the conversion capacitor between a pair of nodes selected from one or more charging voltage division nodes, the DC voltage, and a ground node periodically, such that the charging current is scaled-up of the DC current substantially by a predetermined factor, the factor being larger than 1 whereby the charging current is larger than the DC output current, and/or the charging voltage is substantially a predetermined voltage ratio of the DC voltage; wherein the converted output power is generated through one of the one or more charging voltage division nodes.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
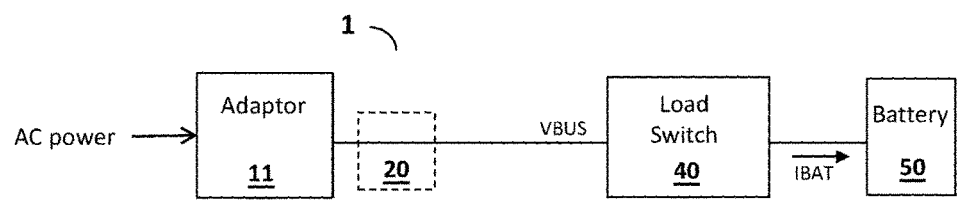
FIG. 1 shows a schematic diagram of a prior art charger circuit.
Figure 2:
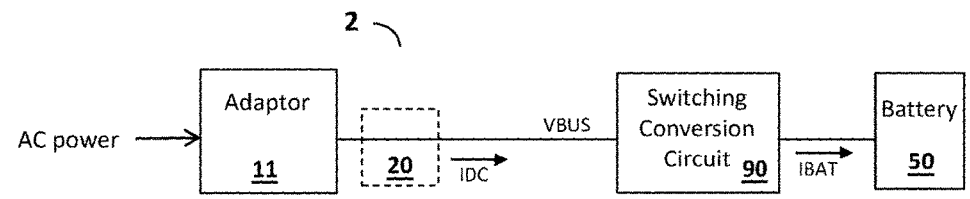
FIG. 2 shows a schematic diagram of another prior art charger circuit.
Figure 3A:
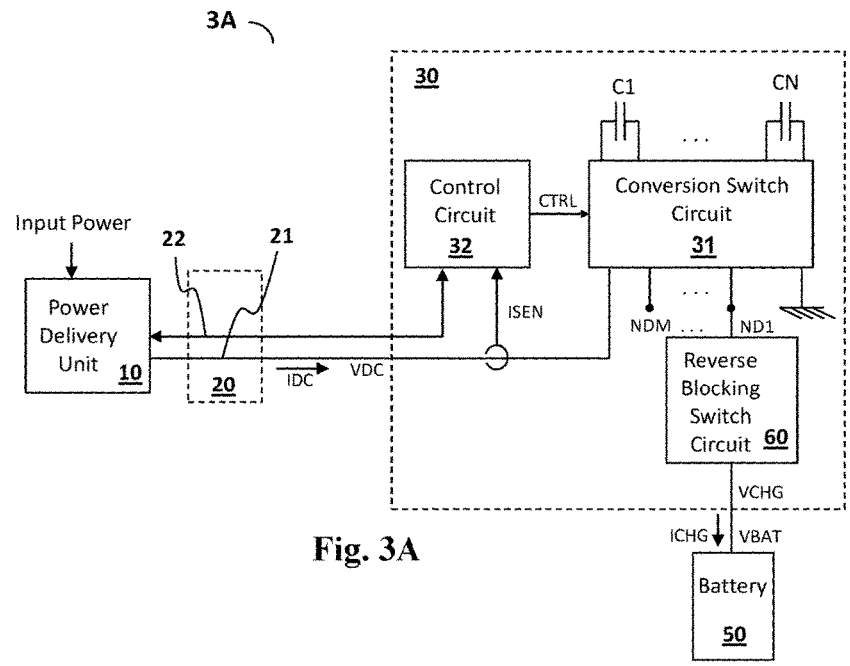
FIGS. 3A and 3B show schematic diagrams of embodiments of the charger circuit according to the present invention.

FIG. 3A shows one embodiment of the charger circuit according to the present invention (charger circuit 3A). As shown in the figure, the charger circuit 3A is configured to operably convert an input power to a DC power and convert the DC power to a charging power for charging a battery 50, wherein the DC power includes a DC voltage VDC and a DC current IDC and the charging power includes a charging voltage VCHG and a charging current ICHG. The charger circuit 3A comprises: a power delivery unit 10, and a capacitive power conversion circuit 30. The power delivery unit 10 is configured to operably convert the input power (for example but not limited to an AC power) to the DC power. The power delivery unit 10 may be for example a power adaptor which converts the input power in AC form to the aforementioned DC power, or may be a DC-DC conversion circuit which converts the input power providing from for example a power bank to the aforementioned DC power. The capacitive power conversion circuit 30 includes: a conversion switch circuit 31, configured to operably convert the DC power to a converted output power, wherein the conversion switch circuit 31 includes plural conversion switches (to be shown in FIG. 3B and in other embodiments), coupled to one or more conversion capacitors (for example C1-CN as shown in the figure, wherein N is a natural number); a control circuit 32, configured to operably generate a conversion switch control signal CTRL to control the plural conversion switches; and at least one reverse blocking switch circuit 60, coupled with the battery 50 and the conversion switch circuit 31 in series, and configured to block a parasitic body current flowing through the body diode of the conversion switch (to be shown and described in detail later), wherein the reverse blocking switch circuit 60 includes at least one reverse blocking switch which has a body diode, and the body diode of the reverse blocking switch is reversely coupled to at least one body diode of the conversion switch. The details of the reverse blocking switch circuit will be described later.

In one embodiment, the capacitive power conversion circuit 30 may include for example but not limited to a divider charge pump. In one embodiment, the power delivery unit 10 is capable of generating a constant current for directly charging the battery 50, bypassing the control of the capacitive power conversion circuit 30 (related circuitry not shown). In another embodiment, in a current scale-up charging mode, the power delivery unit 10 regulates the DC current IDC to a predetermined DC current level, wherein during plural charging conversion time periods in a cycle period, the switch control signal CTRL operates the plural conversion switches so as to electrically connect the one or more conversion capacitors (C1-CN) between a pair of nodes selected from one or more charging voltage division nodes (ND1-NDM shown in FIG. 3A, wherein M is a natural number), the DC voltage VDC, and a ground node periodically, such that the charging current ICHG is scaled-up of the DC current IDC substantially by a predetermined current scale-up factor K. In one preferred embodiment, K is a real number larger than 1, in other words, the charging current ICHG is larger than the DC current IDC. Therefore, with the same level of the DC current IDC, the charger circuit of the present invention can charge the battery 50 with a relatively larger charging current ICHG to reduce the charging time. Note that the charging power is electrically connected to one of the one or more charging voltage division nodes (for example ND1 shown in FIG. 3) to provide the charging current ICHG through the node.

According to the present invention, the aforementioned "predetermined" DC current level may be a fixed value, or an adjustable variable. Also note that, although it is desired for the charging current ICHG to be scaled-up exactly by the predetermined factor K, however due to non-idealities caused by for example imperfection of components or imperfect matching among components, the level of the actual charging current ICHG may not be exactly equal to K times the DC current, but just close to K times, so "substantially" means that there is a tolerable range around the target factor K. In one embodiment with only one voltage division node, the factor K is 2, that is, the charging current level of ICHG is substantially 2 times the predetermined output current level. In other embodiments with plural voltage division nodes, the factor K varies depending on which node the charging power is electrically connected to, and K is not limited to being an integer.

Also note that the power delivery unit 10 is not limited to regulating the DC current IDC at the predetermined DC current level. In one embodiment, the power delivery unit can alternatively regulate the DC voltage VDC at a predetermined DC voltage level. In this case, the capacitive power conversion circuit 30 still can perform the operations mentioned above such that the charging voltage level of VCHG is substantially a predetermined voltage scaling factor J times the DC voltage. In one preferred embodiment, J is a ratio less than 1 for achieving capacitive step-down power conversion.

In one embodiment, the conversion switch of the capacitive power conversion circuit (for example the capacitive power conversion circuit 30) may be a metal-oxide-semiconductor (MOS) transistor which includes a parasitic body diode. When for example the power delivery unit is plug-out (not connected to a power supply) or the DC voltage VDC is lower than the voltage battery VBAT, the body diode of the MOS transistor may undesirably allow a reverse current to flow through, even when none of the conversion switch is ON. The "reverse current" is an undesired current flowing from the battery to the DC voltage when the body diode is forward-biased to be conductive. The "reverse current" is also referred to as "parasitic body current" hereinafter.

Figure 3B:
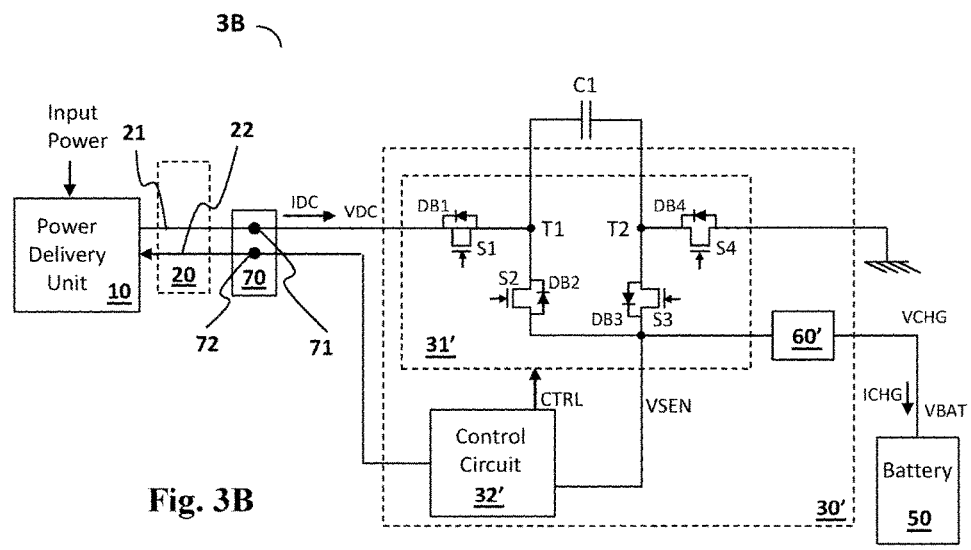

Please refer to FIG. 3B which shows a schematic diagram of one specific embodiment of the capacitive power conversion circuit (capacitive power conversion circuit 30') of the charger circuit (for example the charger circuit 3B) according to the present invention. As shown in the figure, in this embodiment, the capacitive power conversion circuit 30' includes a conversion switch circuit 31', a control circuit 32', and a reverse blocking switch circuit 60', wherein the conversion switch circuit 31' includes plural conversion switches (for example S1, S2, S3 and S4 as shown in the figure) coupled to the conversion capacitor C1. And in this embodiment, there are plural charging conversion time periods (in one cycle period), which include a first and a second charging conversion time periods. The conversion control circuit 32' operates the conversion switches S1, S2, S3 and S4 (for example by issuing the conversion control signal CTRL to the control terminals of the conversion switches S1-S4) so as to electrically connect a first node T1 of the first conversion capacitor C1 to the DC voltage VDC and the charging voltage VCHG correspondingly during the first and the second charging conversion time periods respectively, and electrically connect a second node T2 of the first conversion capacitor C1 to the charging voltage VCHG and the ground node correspondingly during the first and the second charging conversion time periods respectively, such that the charging current ICHG is substantially 2 times the DC current IDC.

Still referring to FIG. 3B, in this embodiment, the conversion switches S1-S4 include body diodes DB1-DB4 respectively. As describe above, when for example the power delivery unit is plug-out or the DC voltage VDC is lower than the voltage battery VBAT, the body diode of the MOS transistor may conduct a "parasitic body current" even when none of the conversion switches S1-S4 is ON, wherein the "parasitic body current" for example may be a current flowing from the battery to the DC voltage VDC through the body diodes DB2 and DB1.

Figure 4A:
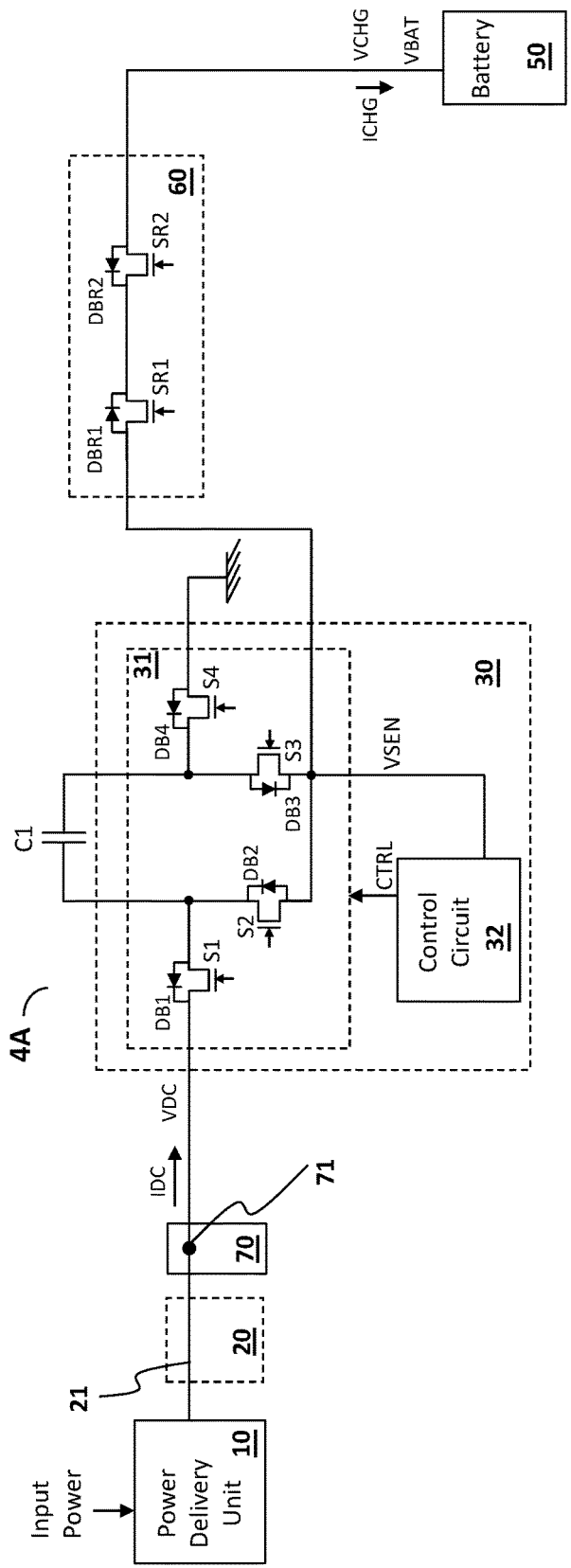
FIGS. 4A-4D show schematic diagrams of embodiments of the charger circuit according to the present invention.

Please refer to FIG. 4A which shows a schematic diagram of one embodiment of the charger circuit (charger circuit 4A) according to the present invention. Compared to the embodiments shown in FIGS. 3A and 3B, this embodiment shows one specific embodiment of the reverse blocking switch circuit 60 of the charger circuit 4. The reverse blocking switch circuit 60 is coupled with the battery 50 and the conversion switch circuit 31 in series, and is configured to block a parasitic body current flowing through at least one body diode (for example the body diodes DB2 and DB1) of at least one conversion switch, wherein the reverse blocking switch circuit 60 includes at least one reverse blocking switch (for example the reverse blocking switch SR1) which has a body diode, and the body diode (for example the body diode DBR1) of the reverse blocking switch is reversely coupled to at least one body diode (for example the body diodes DB2 and DB1) of at least one conversion switch. By the reverse connection among the aforementioned body diodes, the charger circuit of the present invention can avoid the occurrence of the aforementioned parasitic body current even when the power delivery unit 10 is plug-out or the DC voltage VDC is lower than the voltage battery VBAT.

Figure 4B:
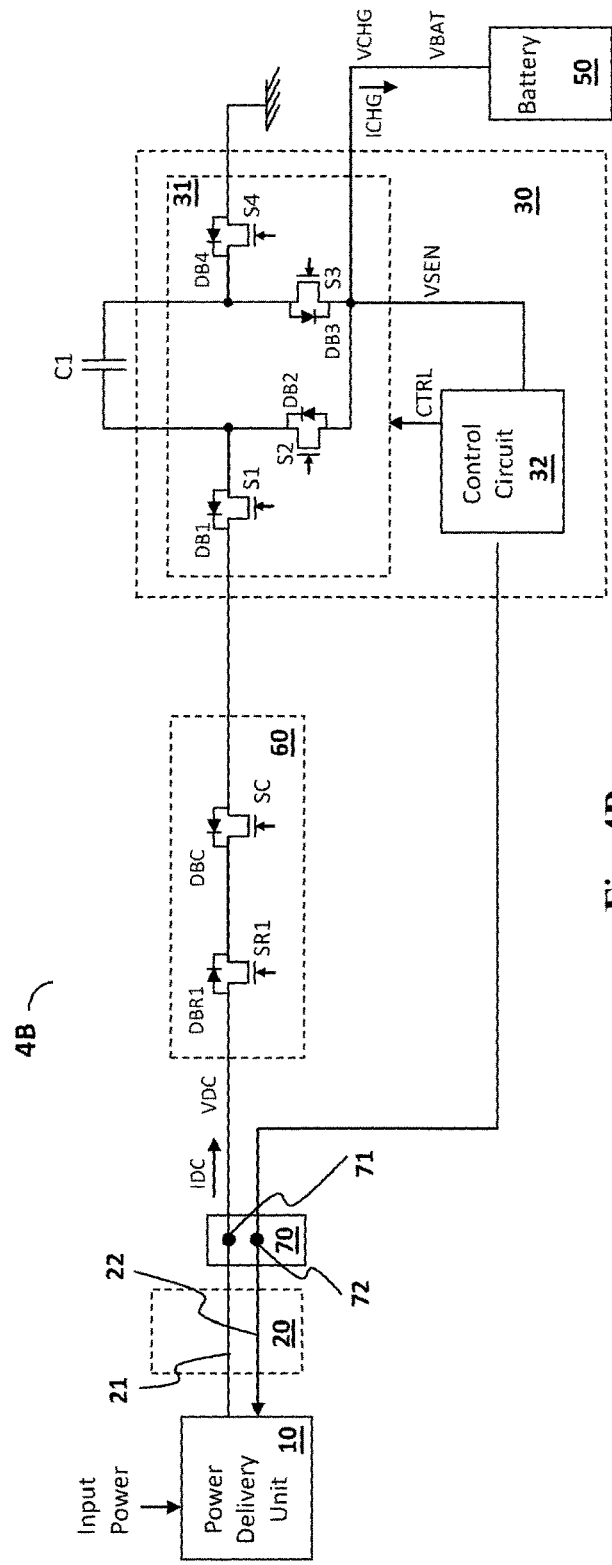

FIG. 4B shows an embodiment which is similar to FIG. 4A; these two figures illustrate that the reverse blocking switch circuit 60 may be coupled in series between the power delivery unit 10 and the conversion switch circuit 31 (as shown in FIG. 4B) or between the battery 50 and the conversion switch circuit 31 (as shown in FIG. 4A). Note that as long as the reverse blocking switch circuit 60 and the conversion switch circuit 31 are coupled in series, and at least one body diode (for example the body diode DBR1) of the reverse blocking switch is reversely coupled to the body diodes of the conversion switches (for example the body diodes DB2 and DB1), the aforementioned "parasitic body current" can be avoided within the spirit of the present invention.

Note that the reverse blocking switch circuit (for example the reverse blocking switch circuit 60 in FIG. 4A and 4B) may be a load switch circuit. The load switch circuit for example may include 2 or more load switches (for example SR1 and SR2 of the reverse blocking switch circuit 60), wherein when the load switches are embodied by MOS transistors, the body diodes thereof (for example DBR1 and DBR2) are reversely connected in series.

Still referring to FIGS. 4A and 4B, in one embodiment, the body diode DBR1 of the reverse blocking switch SR1 also is reversely coupled to the body diodes DB3 and DB4 of the conversion switches S3 and S4, for blocking a parasitic body current which might come from the body diodes DB3 and DB4.

Besides, note that in the embodiment shown in FIG. 4B, the aforementioned converted output power is directly connected to the charging power, that is, the charging voltage VCHG is the same as the converted output voltage and the charging current ICHG is the same as the converted output current. However, in the embodiment shown in FIG. 4A, since the reverse blocking switch circuit 60 is coupled in series between the battery 50 and the conversion switch circuit 31, there is a voltage drop between the converted output voltage and the charging voltage VCHG. That is, in all of the embodiments, the charging power is related to the converted output power, but may not be exactly the same as the converted output power, depending on whether there is any additional component between the converted output power and the charging power.

Figure 4C:
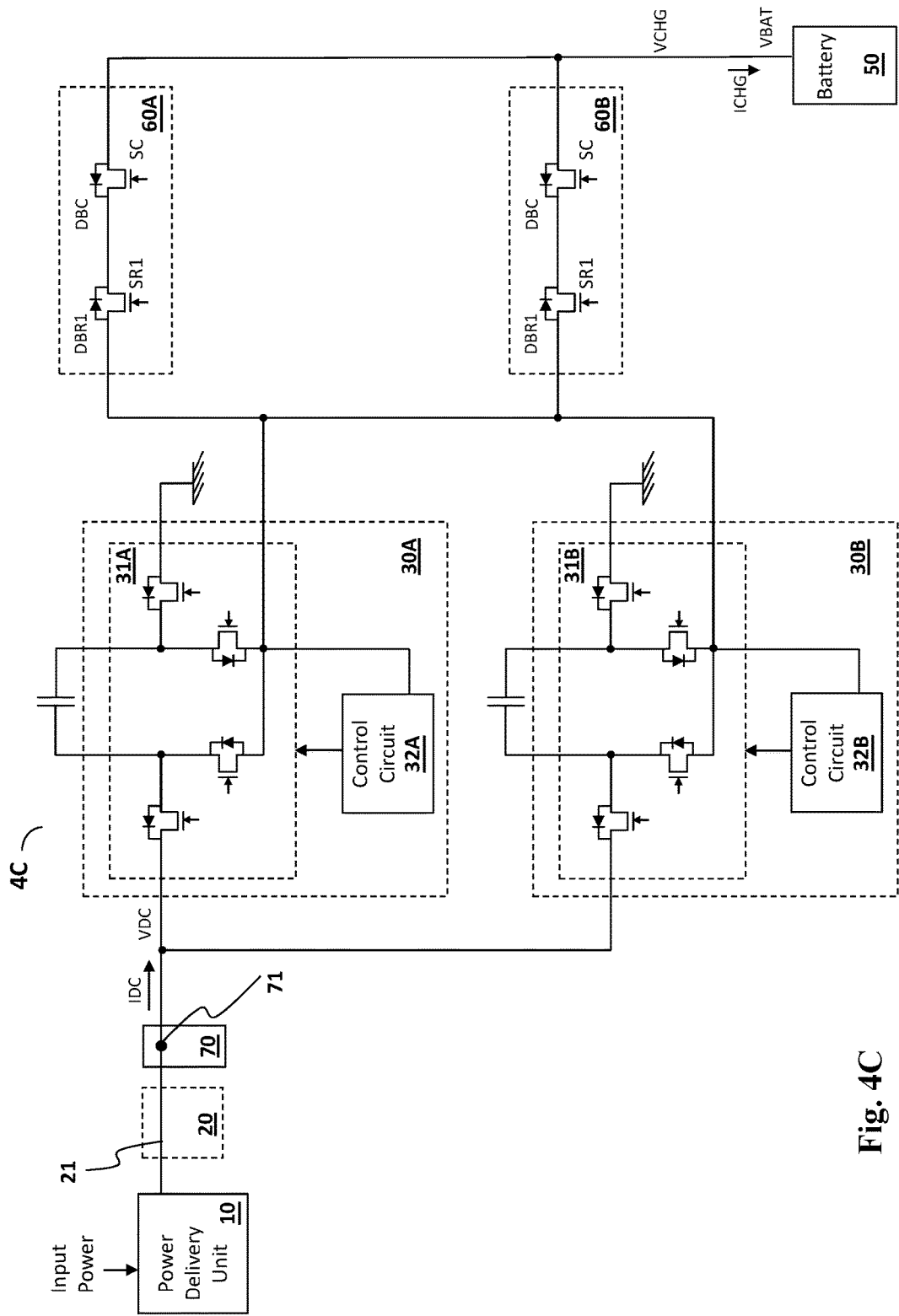
Figure 4D:
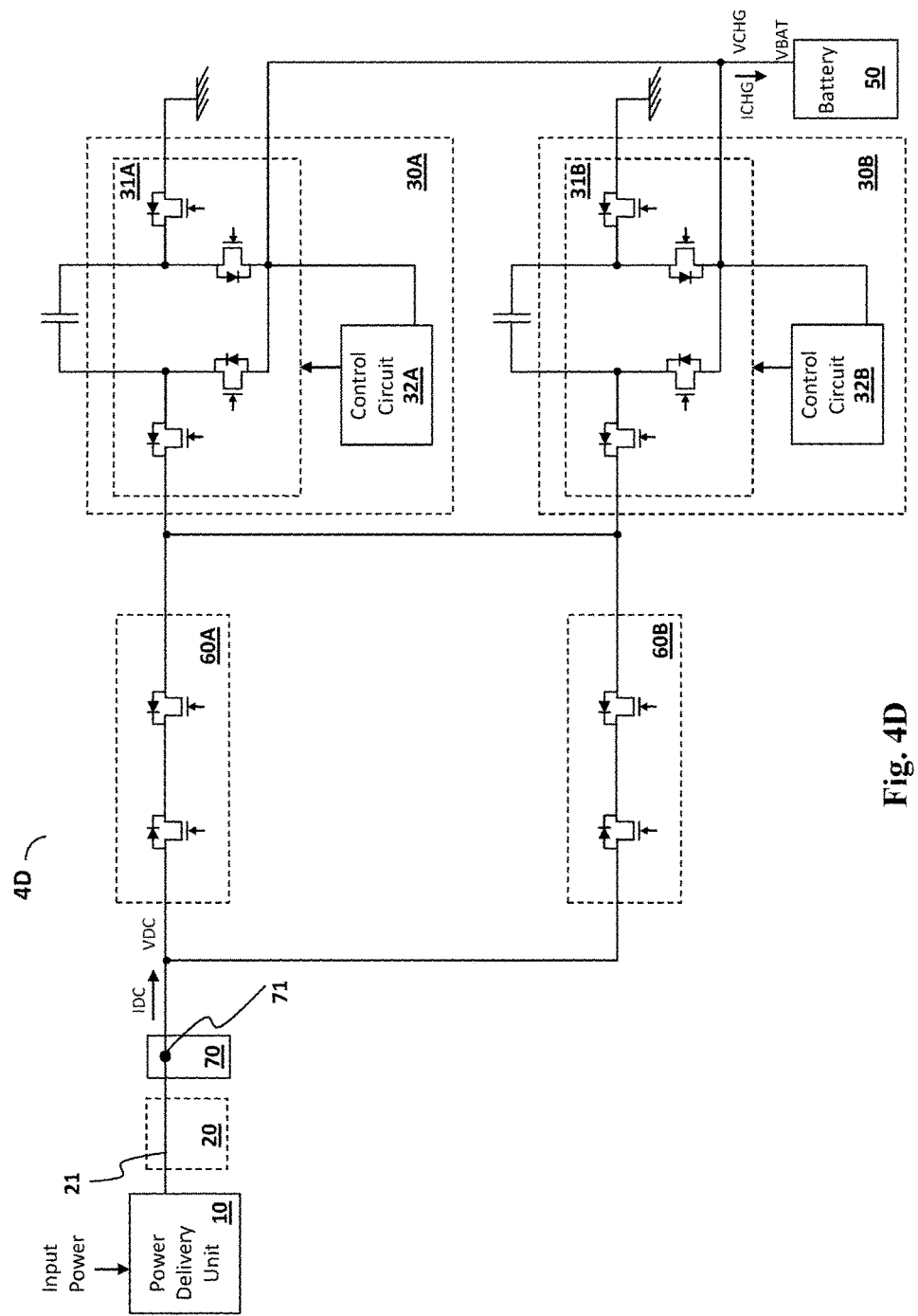

Please refer to FIGS. 4C and 4D; these embodiments illustrate that the charger circuit according to the present invention may include plural capacitive power conversion circuits (30A and 30B) connected in parallel, together with plural reverse blocking switch circuits (60A and 60B) connected in parallel.

In one embodiment, the charger circuit of the present invention may further include a cable 20 and/or a connector 70, coupled between the power delivery unit 10 and the capacitive power conversion circuit 30 (as shown in FIG. 4A), or coupled between the power delivery unit 10 and the reverse blocking switch circuit 60 (as shown in FIG. 4B), wherein the cable 20 and the connector 70 are compliant to the Universal Serial Bus or Universal Serial Bus Power Delivery (USB or USB PD) specifications, and the cable 20 and/or the connector 70 includes a power line and a signal line, wherein the power line is coupled to the DC power and the signal line is configured to operably transmit one or more of a DC current related signal, a DC voltage related signal, a charging current related signal and a charging voltage related signal. As shown in the figures, the aforementioned power line corresponds to the power line 21 of the cable 20 or the power contact 71 of the connector 70, and the aforementioned signal line corresponds to the signal line 22 of the cable 20 or the signal contact 72 of the connector 70. Note that the above-described embodiments are preferred but not necessary; in one embodiment, the cable 20 or the connector 70 can be omitted, and in one embodiment, the signal line between the power delivery unit 10 and the capacitive conversion circuit 30 can also be omitted.

Figure 5A:
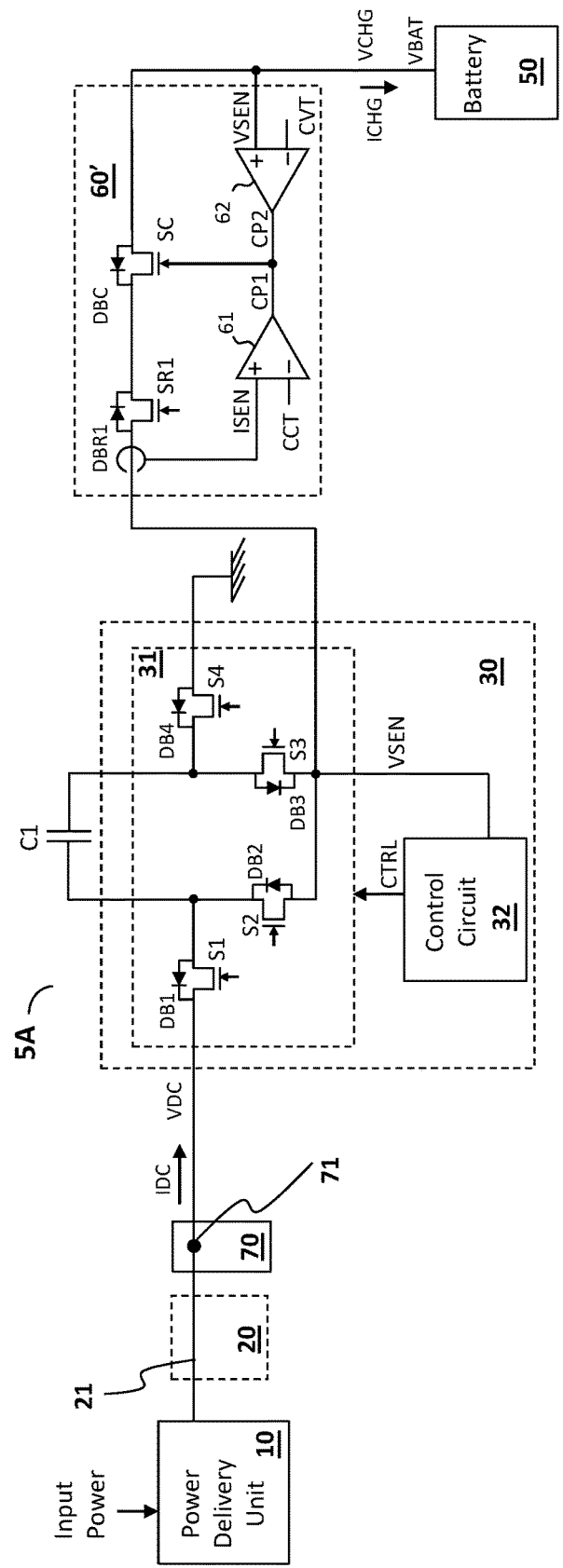
FIGS. 5A-5D show schematic diagrams of several embodiments of the charger circuit and the reverse blocking switch circuit therein according to the present invention.

Please refer to FIG. 5A which shows a schematic diagram of an embodiment of the reverse blocking switch circuit (reverse blocking switch circuit 60') of the charger circuit (for example the charger circuit 5) according to the present invention. The reverse blocking switch circuit 60' further includes a regulation protection switch SC which is connected with the reverse blocking switch SR1 in series, wherein the regulation protection switch SC is controlled according to a charging current related signal ISEN such that the charging current ICHG is regulated to be not larger than a predetermined regulation current level, and/or according to a charging voltage related signal VSEN such that the charging voltage VCHG is regulated to be not larger than a predetermined regulation voltage level.

Figure 5B:
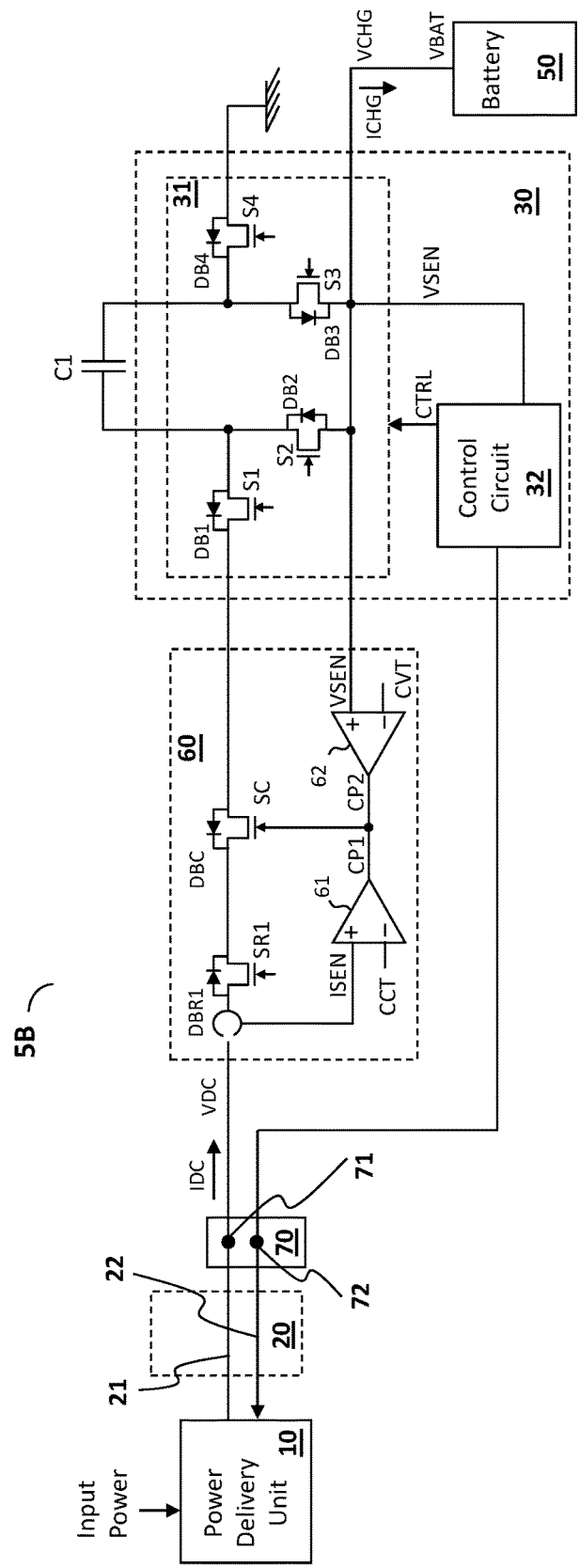

Still referring to FIG. 5A, in one embodiment, the reverse blocking switch circuit 60' further includes a first regulation comparator 61 which is configured to operably compare a charging current related signal ISEN and a regulation current threshold CCT to generate a regulation current comparison result CP1, and control the regulation protection switch SC according to the regulation current comparison result CP1, such that the charging current ICHG is regulated to be not larger than the predetermined regulation current level. In one embodiment, the reverse blocking switch circuit 60' includes a second regulation comparator 62 which is configured to operably compare a charging voltage related signal VSEN and a regulation voltage threshold CVT to a regulation voltage comparison result CP2, and control the regulation protection switch SC according to the regulation voltage comparison result CP2, such that the charging voltage VCHG is regulated to be not larger than the predetermined regulation voltage level. FIG. 5B illustrates that the reverse blocking switch circuit can be connected at a different location according to the present invention.

In one embodiment, the aforementioned regulation threshold CVT is substantially the same as the aforementioned regulation voltage level. In one embodiment, the predetermined regulation threshold CCT is substantially the same as the predetermined regulation current level. In one embodiment, the regulation current comparison result CP1 and the regulation voltage comparison result CP2 can be directly connected with each other at a common node for controlling the regulation switch SC.

It is worth notice that, when the current ripple or the voltage ripple of the power delivery unit 10 is high (for example, when the power delivery unit 10 is regulating the DC current IDC to the predetermined DC current level from far off target or regulating the DC voltage VDC to a predetermined DC voltage level far off target), the regulation protection switch SC and related circuitry and the controlling scheme thereof can protect the battery to keep the charging voltage VCHG and/or the charging current ICHG at a proper level such that the charging voltage VCHG and/or the charging current ICHG will not damage the battery.

Figure 5C:
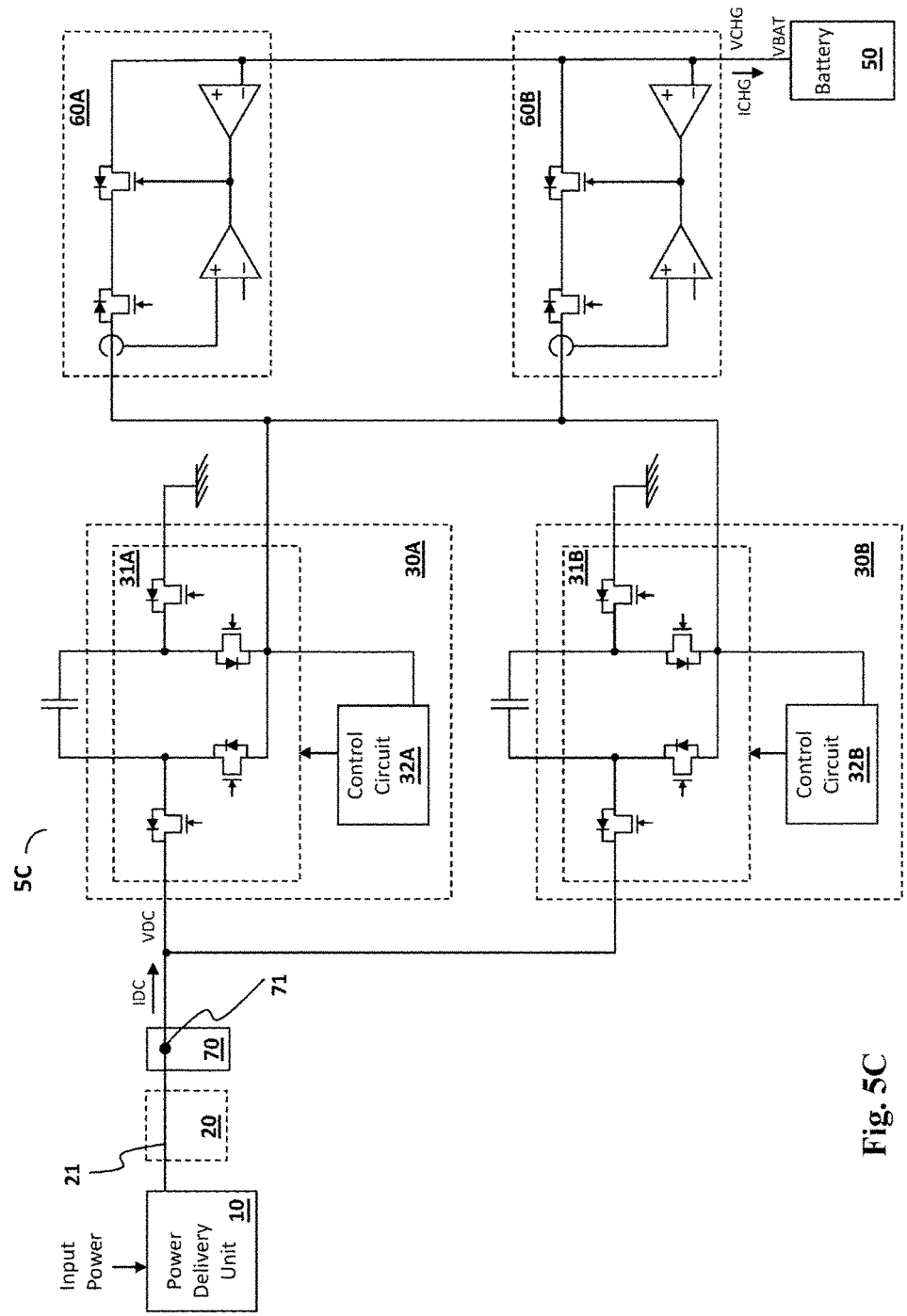
Figure 5D:
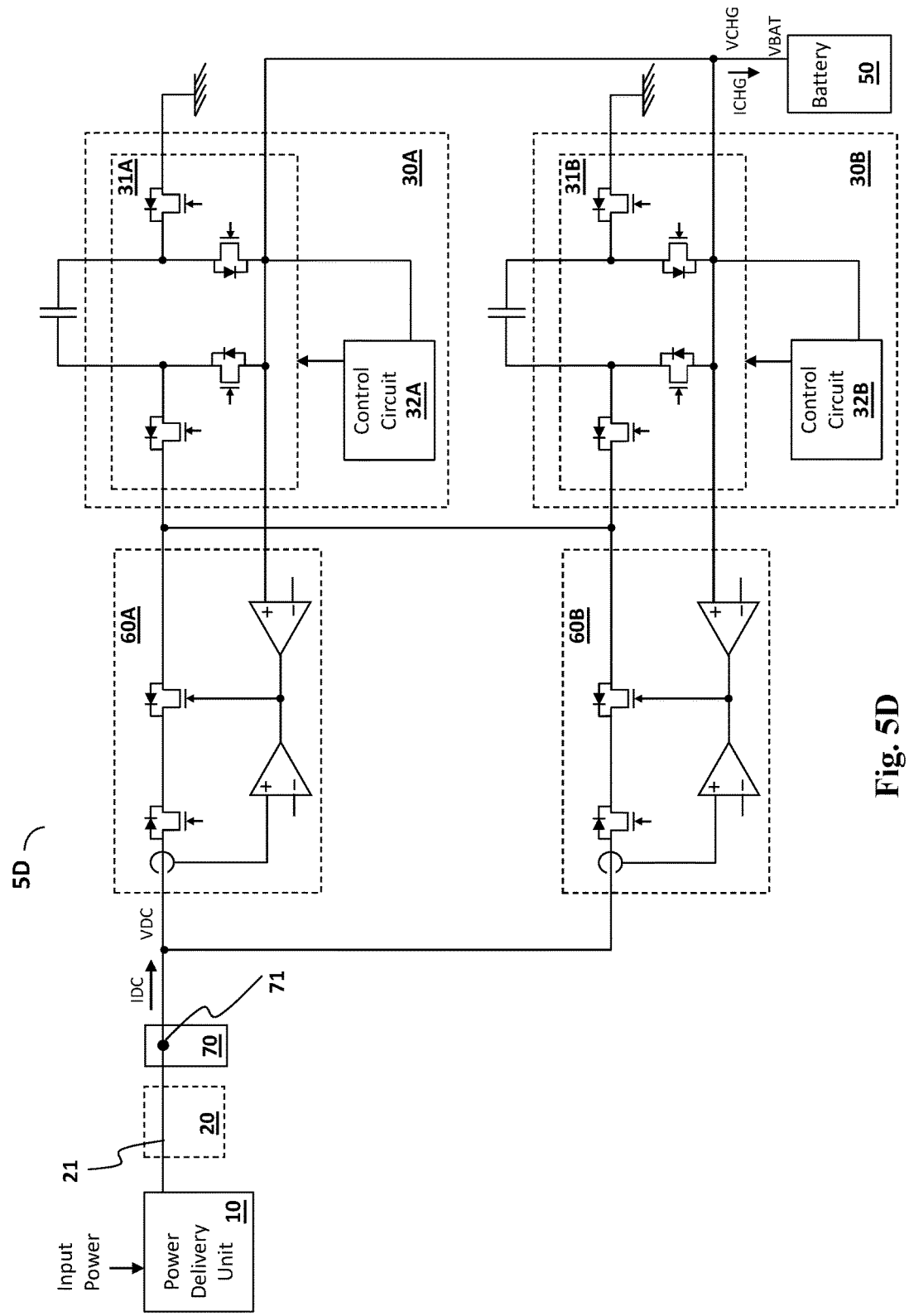

Please refer to FIGS. 5C and 5D; these embodiments show that the present invention may include plural capacitive power conversion circuits (30A and 30B) connected in parallel, together with plural reverse blocking switch circuits (60A and 60B) connected in parallel; the plural reverse blocking switch circuits for example have charging current regulation and/or charging voltage regulation capability.

Figure 6A:
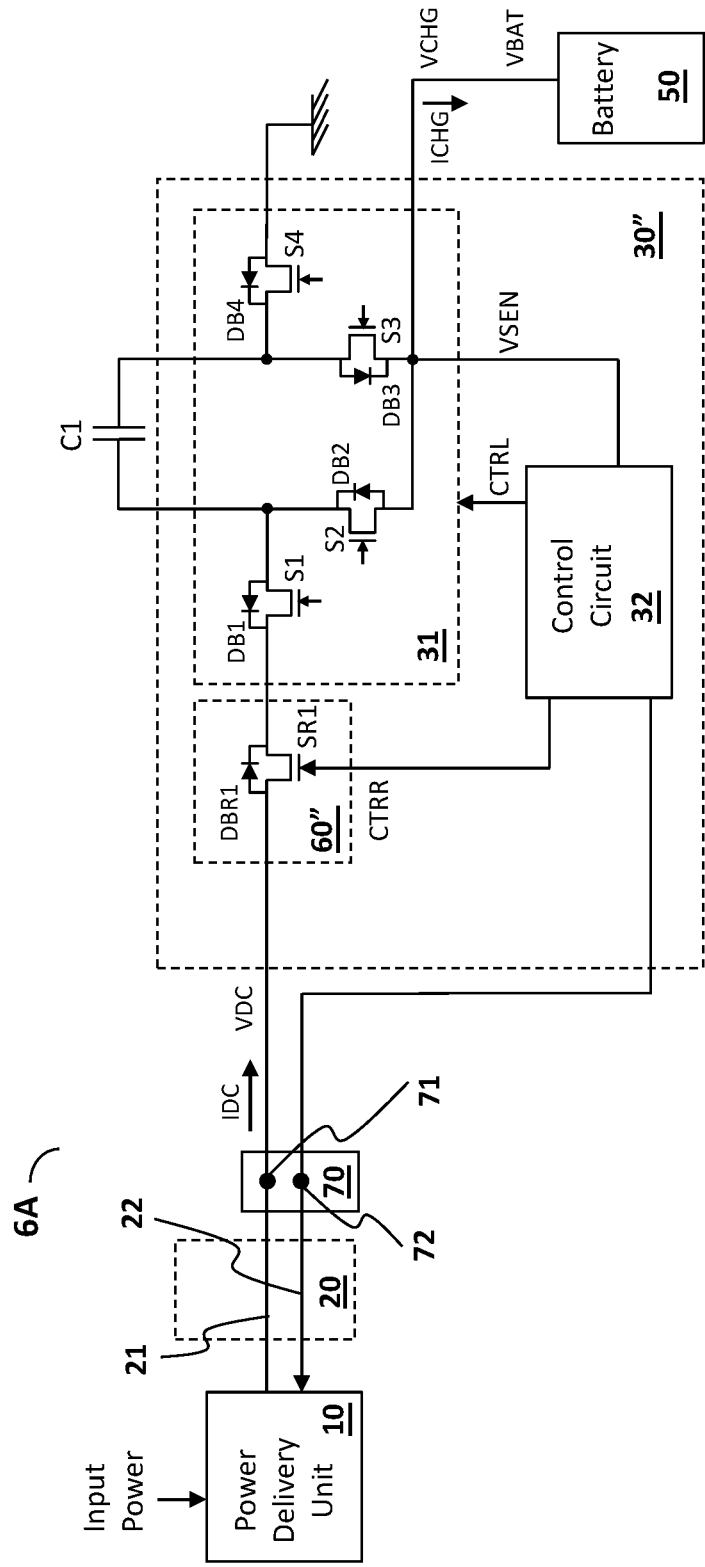
FIGS. 6A-6B show schematic diagrams of several embodiments of the charger circuit and the capacitive power conversion circuit therein according to the present invention.
Figure 6B:
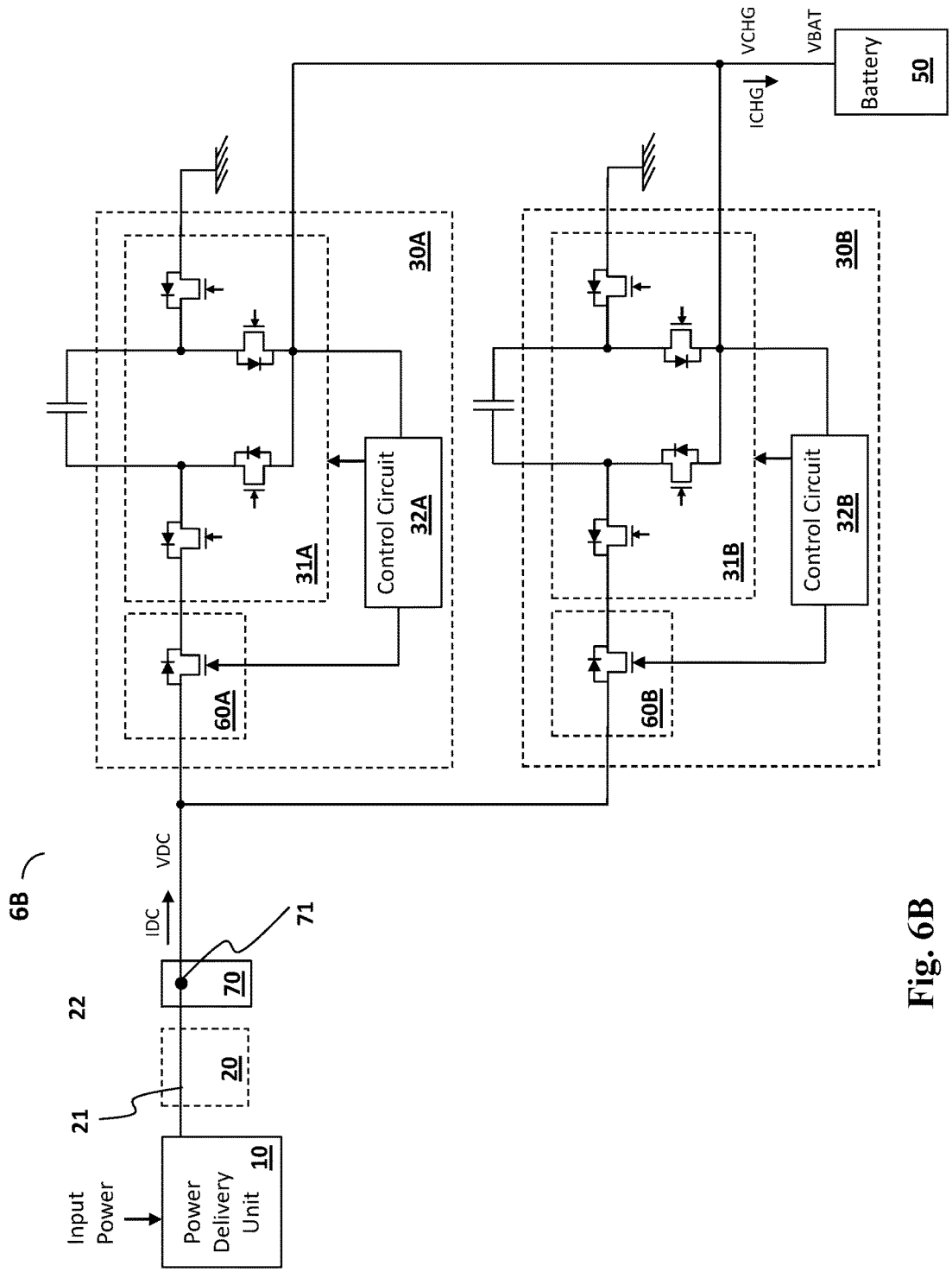

In one embodiment, the capacitive power conversion circuit may include a reverse blocking switch circuit. Referring to FIG. 6A, in this embodiment, the capacitive power conversion circuit 30" includes a reverse blocking switch circuit 60" which is coupled with the battery 50 and the conversion switch circuit 31 in series, wherein the reverse blocking switch circuit 60" includes a reverse blocking switch SR1. The body diode DBR1 of the reverse blocking switch SR1 is reversely coupled to the body diodes DB1 and DB2 of the conversion switches S1 and S2 for blocking a parasitic body current which might from the body diodes DB1 and DB2. In one embodiment, the reverse blocking switch circuit 60" includes one and only one reverse blocking switch SR1. Compared to the aforementioned embodiment wherein the load switch circuit is embodied by two switches, this embodiment can save one switch device to reduce the cost. Besides, in one embodiment, the capacitive power conversion circuit 30" may integrate the reverse blocking switch circuit 60" and the conversion switch circuit into an integrated circuit or these circuits can be packaged into one integrated circuit package. FIG. 6B illustrates that the charger circuit of the present invention may include plural parallel connected capacitive power conversion circuits (30A and 30B).

Figure 7A:
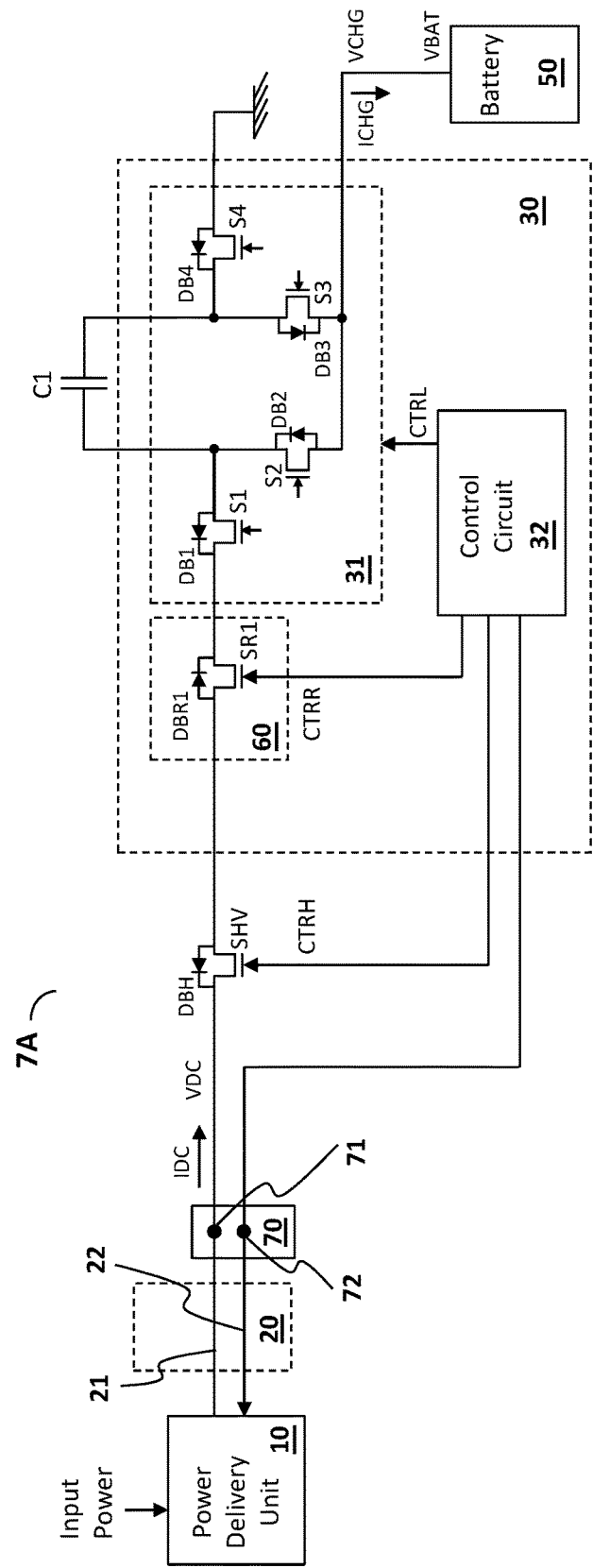
FIGS. 7A-7B show schematic diagrams of several embodiments of the charger circuit according to the present invention.

In one embodiment, the charger circuit may include an external over voltage protection switch couple between the power delivery unit and the capacitive power conversion circuit for blocking any possible high voltage to provide over voltage protection. Referring to FIG. 7A, in this embodiment, the charger circuit 7A includes an external over voltage protection switch SHV couple between the power delivery unit 10 and the capacitive power conversion circuit 30. In one embodiment, the voltage rating of an input terminal (such as the input terminal coupled to the DC voltage VDC as shown in the figure) of the over voltage protection switch SHV is higher than the voltage rating of the capacitive power conversion circuit 30 (including the voltage rating of an input terminal of the reverse blocking switch), such that the over voltage protection switch SHV can block for example but not limited to a voltage surge (occurring for example when the circuits are being connected through the cable and the connector) or an unexpected high DC voltage (such as 12V) so as to protect the capacitive power conversion circuit 30 from damage. In one embodiment, as shown in the figure, the control circuit 31 can generate an over voltage control signal CTRH which is sent to a control terminal of the over voltage protection switch SHV, controlling the over voltage protection switch SHV not to be conductive when for example the DC voltage VDC has an over voltage condition (for example exceeding an over voltage threshold), to protect the capacitive power conversion circuit 30.

Figure 7B:
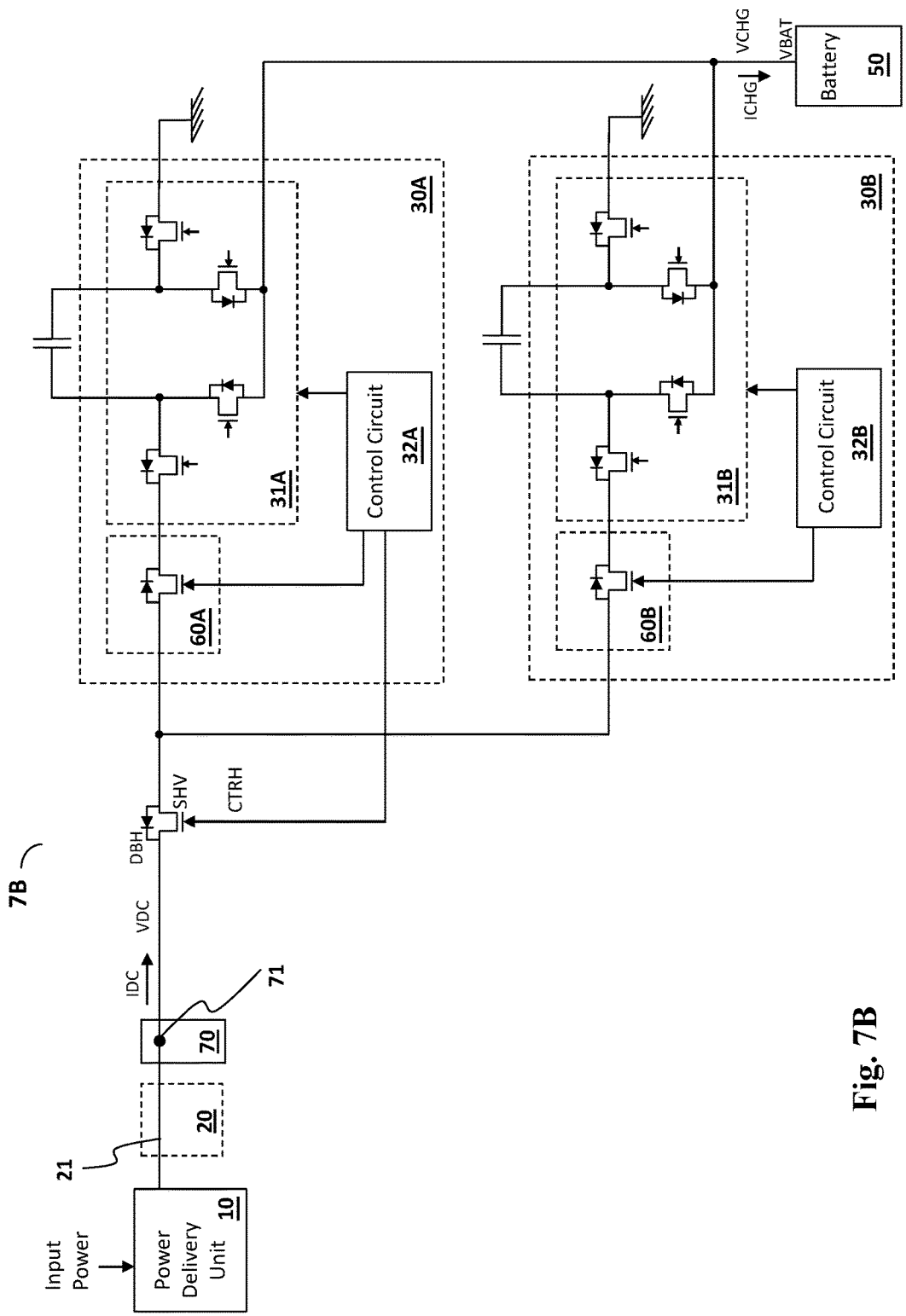

FIG. 7B illustrates that the charger circuit (for example charger circuit 7B) of the present invention may include plural capacitive power conversion circuits (30A and 30B) connected in parallel, wherein the over voltage protection switch SHV is coupled between the power delivery unit 10 and the plural parallel-connected capacitive power conversion circuits.

Figure 8A:
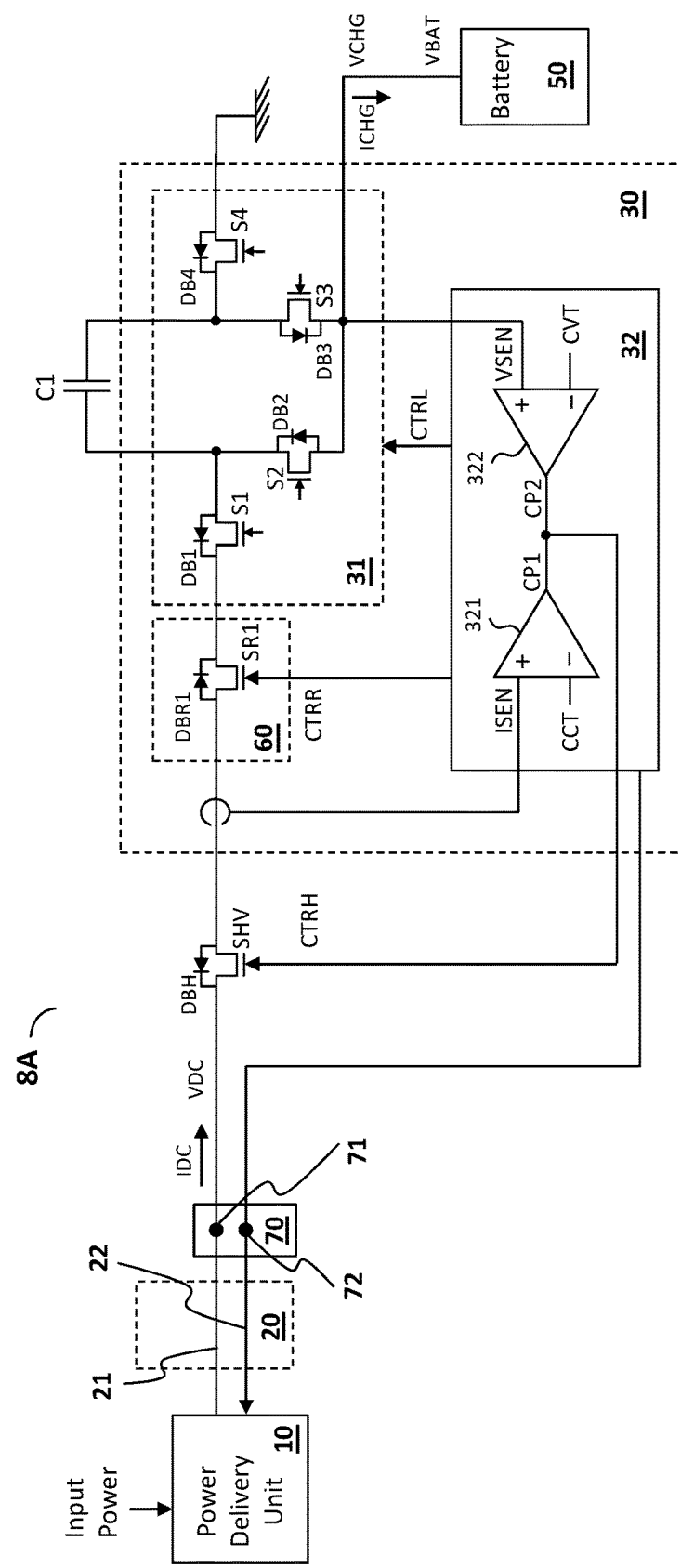
FIGS. 8A-8C show schematic diagrams of several embodiments of the charger circuit and the capacitive power conversion circuit therein according to the present invention.

Referring to FIG. 8A, in one embodiment, the control circuit 31 controls the over voltage protection switch SHV according to a charging current related signal ISEN such that the charging current ICHG is regulated to be not larger than a predetermined regulation current level, and/or according to a charging voltage related signal VSEN such that the charging voltage VCHG is regulated to be not larger than a predetermined regulation voltage level.

Still referring to FIG. 8A, in one embodiment, the control circuit 31 includes a regulation comparator 311 which is configured to operably compare a charging current related signal ISEN and a regulation current threshold CCT to generate a regulation current comparison result CP1, and control the over voltage protection switch SHV according to the regulation current comparison result CP1, such that the charging current ICHG is regulated to be not larger than the predetermined regulation current level. In one embodiment, the control circuit 31 includes a regulation comparator 312 which is configured to operably compare a charging voltage related signal VSEN and a regulation voltage threshold CVT to a regulation voltage comparison result CP2, and control the over voltage protection switch SHV according to the regulation voltage comparison result CP2, such that the charging voltage VCHG is regulated to be not larger than the predetermined regulation voltage level.

Figure 8B:
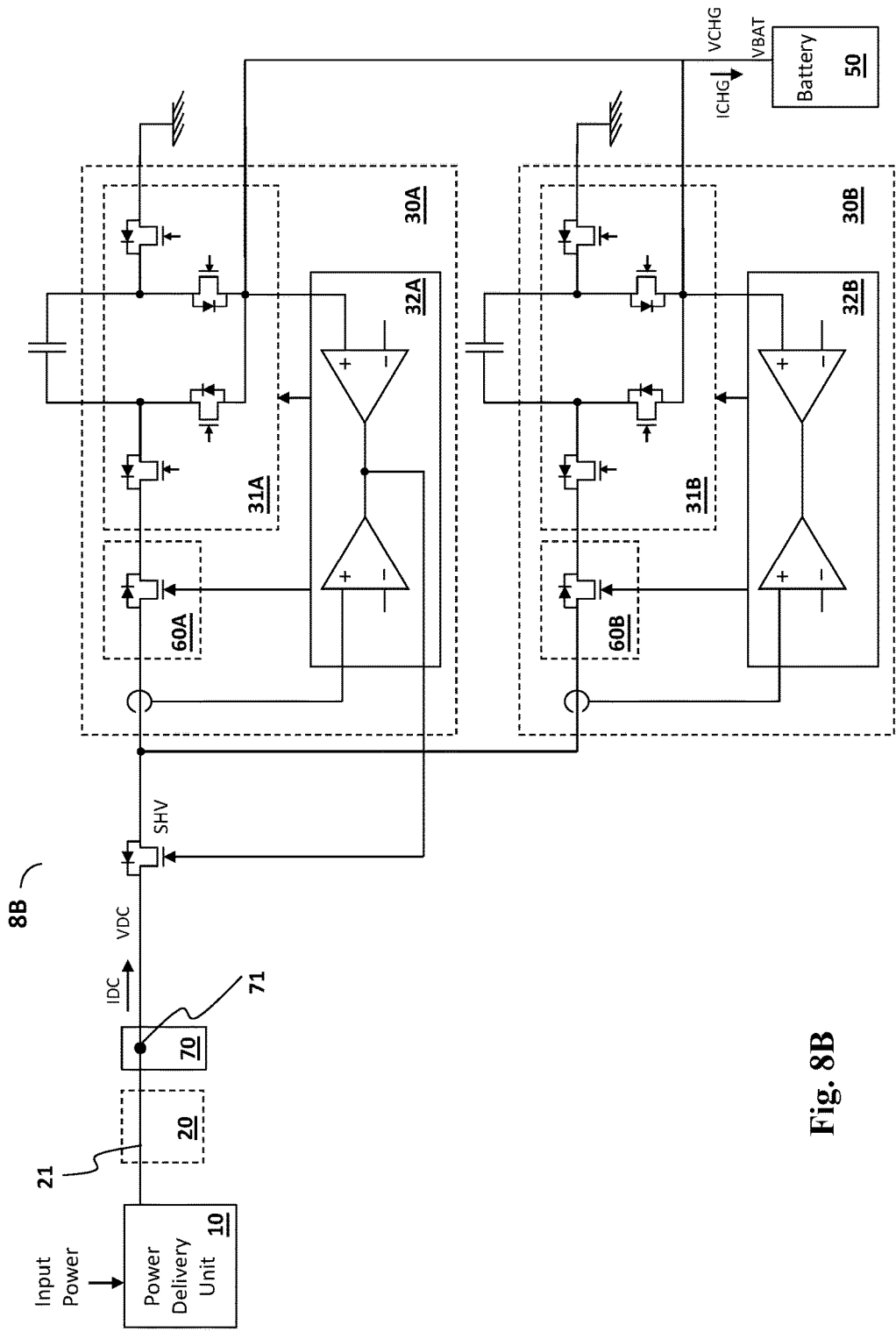

FIG. 8B illustrates that the charger circuit (for example charger circuit 8B) of the present invention may include plural capacitive power conversion circuits (30A and 30B) connected in parallel, wherein the over voltage protection switch SHV is coupled between the power delivery unit 10 and the plural parallel-connected capacitive power conversion circuits.

Figure 8C:
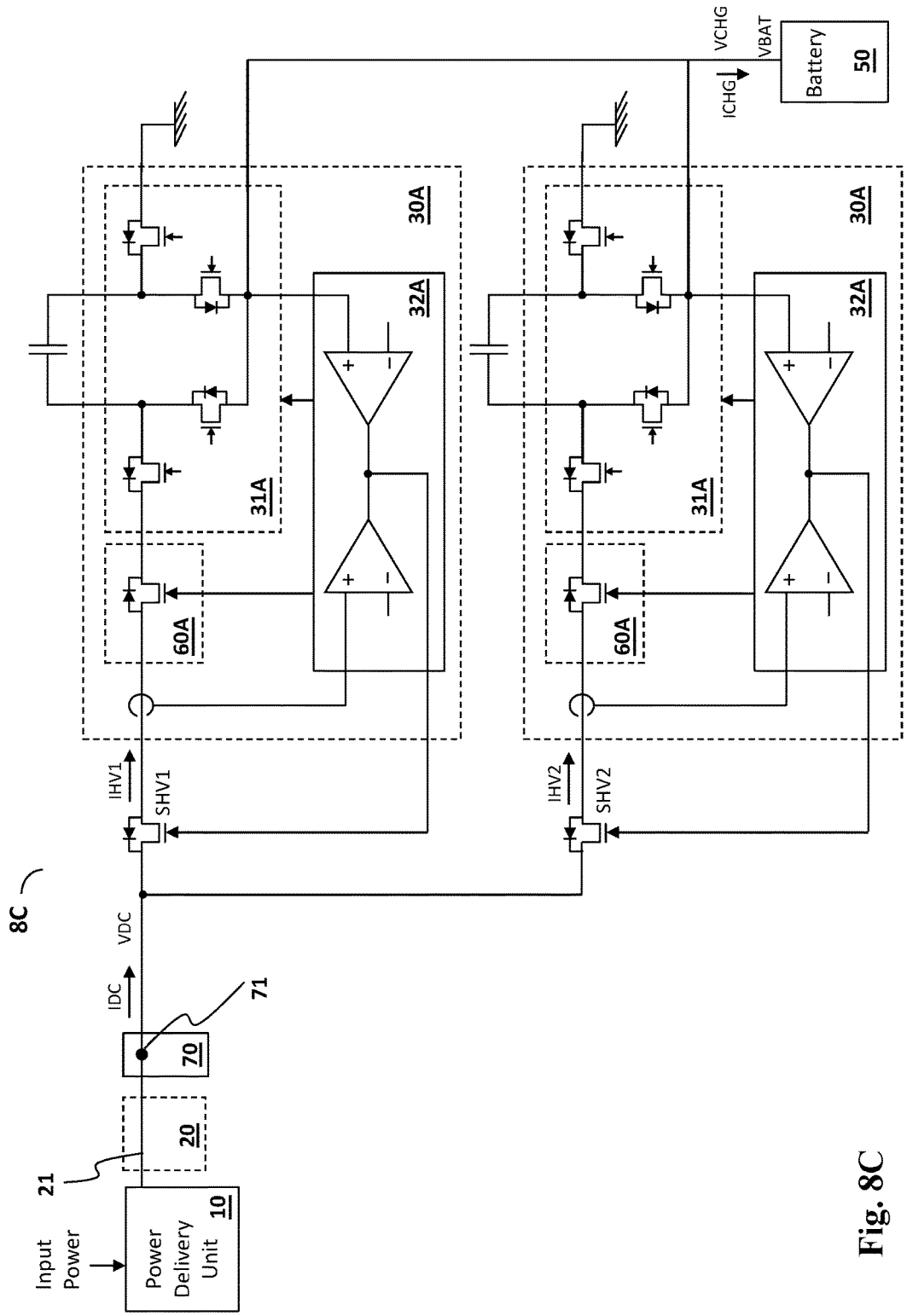

In one embodiment, the charger circuit of the present invention may include plural over voltage protection switches which, in addition to providing the aforementioned over voltage protection and blocking functions, can also function to balance the current distribution. Referring to FIG. 8C, the charger circuit 8C includes 2 serial circuits of an over voltage protection switch and a capacitive power conversion circuit (as shown in the figure, the over voltage protection switch SHV1 is connected with the capacitive power conversion circuit 30A in series and the over voltage protection switch SHV2 is connected with the capacitive power conversion circuit 30B in series), wherein these 2 serial circuits of the over voltage protection switch and the capacitive power conversion circuit are connected in parallel. In one embodiment, the over voltage protection switches SHV1 and SHV2 can sense and control the current flowing through each of the over voltage protection switches such that the currents flowing through the over voltage protection switches are substantially the same as one another, that is, the current IHV1 and the current IHV2 are substantially the same.

Note that the aforementioned charging current related signal ISEN may be for example the charging current itself, or a current through switch located on the charging current path, such as the current flowing through the reverse blocking switch, the regulation protection switch, or the over voltage protection switch, as shown in FIG. 5A or 5B.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a line of one embodiment can be used to replace a corresponding line of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charger circuit, configured to operably convert an input power to a DC power and convert the DC power to a charging power for charging a battery, wherein the DC power includes a DC voltage and a DC current and the charging power includes a charging voltage and a charging current; the charger circuit comprising:
   a power delivery unit, configured to operably convert the input power to the DC power; and
   at least one capacitive power conversion circuit, including:
      a conversion switch circuit, configured to operably convert the DC power to a converted output power which includes a converted output voltage and a converted output current, wherein the charging power is related to the converted output power; wherein the conversion switch circuit includes plural conversion switches, configured to be coupled to at least one conversion capacitor, wherein at least one of the conversion switches includes a body diode;
      a control circuit, configured to operably generate a conversion switch control signal to control the plural conversion switches; and
      at least one reverse blocking switch circuit, coupled with the battery and the conversion switch circuit in series, and configured to block a parasitic body current flowing through the body diode of the conversion switch, wherein the reverse blocking switch circuit includes at least one reverse blocking switch which has a body diode, and the body diode of the reverse blocking switch is reversely coupled to said body diode of the conversion switch;
      wherein in a charging mode, the power delivery unit regulates the DC current to a predetermined DC current level, and/or regulates the DC voltage to a predetermined DC voltage level, and during plural charging conversion time periods in a cycle period, the conversion switch control signal operates the plural conversion switches so as to electrically connect the conversion capacitor between a pair of nodes selected from one or more charging voltage division nodes, the DC voltage, and a ground node periodically, such that the charging current is scaled-up of the predetermined DC current level substantially by a predetermined factor, the factor being larger than 1 whereby the charging current is larger than the DC output current, and/or the charging voltage is substantially a predetermined voltage ratio of the predetermined DC voltage level; wherein the converted output power is generated through one of the one or more charging voltage division nodes.

2. The charger circuit of claim 1, wherein the reverse blocking switch is connected in series between the power delivery unit and the capacitive power conversion circuit, or between the battery and the capacitive power conversion circuit.

3. The charger circuit of claim 1, wherein the charger circuit includes plural capacitive power conversion circuits and the reverse blocking switch circuit includes plural reverse blocking switches, wherein the plural capacitive power conversion circuits are coupled in parallel and/or the plural reverse blocking switches are coupled in parallel.

4. The charger circuit of claim 1, wherein the reverse blocking switch circuit further includes a regulation protection switch and a first regulation comparator and/or a second regulation comparator, wherein the first regulation comparator is configured to operably compare a charging current related signal and a regulation current threshold to generate a regulation current comparison result, and control the regulation protection switch according to the regulation current comparison result, such that the charging current is regulated to be not larger than a predetermined regulation current level; and the second regulation comparator is configured to operably compare a charging voltage related signal and a regulation voltage threshold to generate a regulation voltage comparison result, and control the regulation protection switch according to the regulation voltage comparison result, such that the charging voltage is regulated to be not larger than a predetermined regulation voltage level.

5. The charger circuit of claim 1, wherein the capacitive power conversion circuit and the reverse blocking switch circuit are integrated into an integrated circuit or packaged into an integrated circuit package.

6. The charger circuit of claim 5, further including at least an over voltage protection switch, wherein a voltage rating of an input terminal of the over voltage protection switch is higher than a voltage rating of an input terminal of the reverse blocking switch, and/or higher than a voltage rating of an input terminal of the conversion switch, wherein the control circuit further generates an over voltage control signal to control a control terminal of the over voltage protection switch.

7. The charger circuit of claim 6, wherein the control circuit includes a first regulation comparator and/or a second regulation comparator, wherein the first regulation comparator is configured to operably compare a charging current related signal and a regulation current threshold to generate a regulation current comparison result, and control the over voltage protection switch according to the regulation current comparison result, such that the charging current is regulated to be not larger than a predetermined regulation current level; and the second regulation comparator is configured to operably compare a charging voltage related signal and a regulation voltage threshold to generate a regulation voltage comparison result, and control the over voltage protection switch according to the regulation voltage comparison result, such that the charging voltage is regulated to be not larger than a predetermined regulation voltage level.

8. The charger circuit of claim 6, wherein the charger circuit includes plural over voltage protection switches, wherein the plural over voltage protection switches are configured to operably sense and control currents flowing through the over voltage protection switches such that each current flowing through each of the over voltage protection switches is substantially the same.

9. The charger circuit of claim 1, further including a cable and/or a connector, coupled between the power delivery unit and the capacitive power conversion circuit, or coupled between the power delivery unit and the reverse blocking switch circuit, wherein the cable and the connector are compliant to the Universal Serial Bus or Universal Serial Bus Power Delivery (USB or USB PD) specifications, and the cable and/or the connector includes a power line and a signal line, wherein the power line is coupled to the DC power and the signal line is configured to operably transmit one or more of a DC current related signal, a DC voltage related signal, a charging current related signal, and a charging voltage related signal.

10. A capacitive power conversion circuit for use in a charger circuit which is configured to operably convert an input power to a DC power and convert the DC power to a charging power for charging a battery, wherein the DC power includes a DC voltage and a DC current and the charging power includes a charging voltage and a charging current, the capacitive power conversion circuit comprising:
   a conversion switch circuit, configured to operably convert the DC power to a converted output power which includes a converted output voltage and a converted output current, wherein the charging power is related to the converted output power; wherein the conversion switch circuit includes plural conversion switches, configured to be coupled to at least one conversion capacitor, wherein at least one of the conversion switches includes a body diode;
   a control circuit, configured to operably generate a conversion switch control signal to control the plural conversion switches; and
   at least one reverse blocking switch circuit, coupled with the battery and the conversion switch circuit in series, and configured to block a parasitic body current flowing through the body diode of the conversion switch, wherein the reverse blocking switch circuit includes at least one reverse blocking switch which has a body diode, and the body diode of the reverse blocking switch is reversely coupled to said body diode of the conversion switch;
   wherein in a charging mode, during plural charging conversion time periods in a cycle period, the conversion switch control signal operates the plural conversion switches so as to electrically connect the conversion capacitor between a pair of nodes selected from one or more charging voltage division nodes, the DC voltage, and a ground node periodically, such that the charging current is scaled-up of the DC current substantially by a predetermined factor, the factor being larger than 1 whereby the charging current is larger than the DC output current, and/or the charging voltage is substantially a predetermined voltage ratio of the DC voltage; wherein the converted output power is generated through one of the one or more charging voltage division nodes.

11. The capacitive power conversion circuit of claim 10, wherein the charger circuit further includes at least an over voltage protection switch, wherein a voltage rating of an input terminal of the over voltage protection switch is higher than a voltage rating of an input terminal of the reverse blocking switch, and/or higher than a voltage rating of an input terminal of the conversion switch, wherein the control circuit further generates an over voltage control signal to control a control terminal of the over voltage protection switch.

12. The capacitive power conversion circuit of claim 11, wherein the control circuit includes a first regulation comparator and/or a second regulation comparator, wherein the first regulation comparator is configured to operably compare a charging current related signal and a regulation current threshold to generate a regulation current comparison result, and control the over voltage protection switch according to the regulation current comparison result, such that the charging current is regulated to be not larger than a predetermined regulation current level; and the second regulation comparator is configured to operably compare a charging voltage related signal and a regulation voltage threshold to generate a regulation voltage comparison result, and control the over voltage protection switch according to the regulation voltage comparison result, such that the charging voltage is regulated to be not larger than a predetermined regulation voltage level.

13. The capacitive power conversion circuit of claim 11, wherein the control circuit controls currents flowing through the over voltage protection switches to be substantially the same as one another.

14. A reverse blocking switch circuit for use in a charger circuit which is configured to operably convert an input power to a DC power and convert the DC power to a charging power for charging a battery, wherein the DC power includes a DC voltage and a DC current and the charging power includes a charging voltage and a charging current, wherein the charger circuit comprises: a power delivery unit which is configured to operably convert the input power to the DC power; and a capacitive power conversion circuit, including: a conversion switch circuit, configured to operably convert the DC power to a converted output power which includes a converted output voltage and a converted output current, wherein the charging power is related to the converted output power; wherein the conversion switch circuit includes plural conversion switches, configured to be coupled to at least one conversion capacitor, wherein at least one of the conversion switches includes a body diode; the reverse blocking switch circuit being coupled with the battery and the conversion switch circuit in series, and configured to block a parasitic body current flowing through the body diode of the conversion switch; the reverse blocking switch circuit comprising:

at least one reverse blocking switch which has a body diode, and the body diode of the reverse blocking switch is reversely coupled to said body diode of the conversion switch;

a regulation protection switch, coupled in series with the reverse blocking switch; and a first regulation comparator and/or a second regulation comparator, wherein the first regulation comparator is configured to operably compare a charging current related signal and a regulation current threshold to generate a regulation current comparison result, and control the regulation protection switch according to the regulation current comparison result, such that the charging current is regulated to be not larger than a predetermined regulation current level; and the second regulation comparator is configured to operably compare a charging voltage related signal and a regulation voltage threshold to generate a regulation voltage comparison result, and control the regulation protection switch according to the regulation voltage comparison result, such that the charging voltage is regulated to be not larger than a predetermined regulation voltage level;

wherein in a charging mode, during plural charging conversion time periods in a cycle period, the conversion switch control signal operates the plural conversion switches so as to electrically connect the conversion capacitor between a pair of nodes selected from one or more charging voltage division nodes, the DC voltage, and a ground node periodically, such that the charging current is scaled-up of the DC current substantially by a predetermined factor, the factor being larger than 1 whereby the charging current is larger than the DC output current, and/or the charging voltage is substantially a predetermined voltage ratio of the DC voltage; wherein the converted output power is generated through one of the one or more charging voltage division nodes.

\* \* \* \* \*